United States Patent
Dudar

(10) Patent No.: US 10,071,675 B2
(45) Date of Patent: Sep. 11, 2018

(54) AUTONOMOUS VEHICLE HEADLIGHT DEACTIVATION

(71) Applicant: Ford Global Technologies, LLC, Dearborn, MI (US)

(72) Inventor: Aed M. Dudar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 78 days.

(21) Appl. No.: 15/227,144

(22) Filed: Aug. 3, 2016

(65) Prior Publication Data

US 2018/0037154 A1    Feb. 8, 2018

(51) Int. Cl.
*B60Q 1/14*      (2006.01)
*B60Q 1/08*      (2006.01)

(52) U.S. Cl.
CPC .......... *B60Q 1/1423* (2013.01); *B60Q 1/08* (2013.01); *B60Q 1/143* (2013.01); *B60Q 2300/054* (2013.01); *B60Q 2300/14* (2013.01); *B60Q 2300/41* (2013.01); *B60Q 2300/42* (2013.01); *B60Q 2300/45* (2013.01)

(58) Field of Classification Search
CPC .... G05D 1/0088; G05D 1/0214; G05D 1/024; G05D 1/0246; G05D 1/0257; G05D 2201/0213; B60W 30/08; G06K 9/00791; G06K 9/3241; G06K 9/00805; G06K 9/00798; G08G 1/166; B60Q 1/04; B60Q 1/076; B60Q 1/085; B60Q 1/14; B60Q 1/1423; B60Q 1/08; B60Q 2300/41; B60Q 2300/42; B60Q 2300/45
See application file for complete search history.

(56) References Cited

U.S. PATENT DOCUMENTS

| | | | |
|---|---|---|---|
| 5,715,093 A * | 2/1998 | Schierbeek | B60Q 1/1423 359/265 |
| 6,097,156 A | 8/2000 | Diep | |
| 6,405,132 B1 * | 6/2002 | Breed | B60N 2/002 701/117 |
| 6,587,573 B1 | 7/2003 | Stam et al. | |
| 8,660,734 B2 * | 2/2014 | Zhu | G05D 1/0055 701/23 |
| 8,946,990 B1 * | 2/2015 | Gupta | B60Q 1/143 250/208.2 |
| 9,215,781 B2 | 12/2015 | Marman | |
| 9,313,862 B1 | 4/2016 | Helton | |
| 9,365,218 B2 * | 6/2016 | Pallett | B60W 50/082 |
| 9,436,880 B2 * | 9/2016 | Bos | B60N 2/002 |
| 9,616,896 B1 * | 4/2017 | Letwin | B60W 30/182 |
| 9,650,019 B2 * | 5/2017 | Weston | B60T 7/12 |
| 9,694,737 B2 * | 7/2017 | Chambers | B60Q 1/143 |
| 9,751,534 B2 * | 9/2017 | Fung | B60W 40/08 |
| 2011/0063861 A1 | 3/2011 | Edgeworth et al. | |
| 2013/0188374 A1 | 7/2013 | Schneider et al. | |
| 2017/0364072 A1 * | 12/2017 | Yako | G01C 21/34 |

* cited by examiner

*Primary Examiner* — Haissa Philogene
(74) *Attorney, Agent, or Firm* — Frank A. MacKenzie; Bejin Bieneman PLC

(57) ABSTRACT

A vehicle system includes an autonomous driving sensor and a processor. The autonomous driving sensor is programmed to output an object detection signal representing an object near a host vehicle. The processor is programmed to output a headlight activation signal to activate vehicle headlights in response to receiving the object detection signal and while the host vehicle is operating in an autonomous mode.

20 Claims, 4 Drawing Sheets

AUTONOMOUS VEHICLE HEADLIGHT DEACTIVATION

BACKGROUND

Vehicles headlights serve several purposes. First, they allow the vehicle driver to see an area ahead of the vehicle. Second, headlights allow occupants of oncoming vehicles and pedestrians to see that a vehicle is approaching. Therefore, headlights provide additional visibility in low light conditions (e.g., at night, during storms, etc.).

DETAILED DESCRIPTION

Autonomous vehicles rely on on-board vehicle sensors that do not require ambient light to operate. For example, a LIDAR sensor uses lasers to sense the area surrounding the vehicle. RADAR sensors rely on radio waves. Ultrasonic sensors rely on sound waves. As such, autonomous vehicles do not necessarily need headlights during low light conditions.

Eliminating the headlights altogether in autonomous vehicles may have some advantages. For example, eliminating the headlights would make the vehicle lighter and use less energy. But headlights still have benefit to the occupants of the autonomous vehicle. The occupants may wish to see the area ahead of the vehicle, especially if one of the occupant needs or desires to assume non-autonomous control of the vehicle. Further, drivers of oncoming vehicles and pedestrians would appreciate being able to see an oncoming vehicle.

One way to reduce in-vehicle energy usage is to incorporate a headlight control system into the vehicle that turns off the headlights under certain circumstances, such as when the vehicle is traveling in an autonomous mode and no objects (e.g., other vehicles, pedestrians, cyclists, etc.) are detected nearby. In response to detecting an object, the headlight control system may turn on the headlights.

An example headlight control system includes an autonomous driving sensor and a processor. The autonomous driving sensor is programmed to output an object detection signal representing an object near a host vehicle. The processor is programmed to output a headlight activation signal to activate the vehicle headlights in response to receiving the object detection signal and while the host vehicle is operating in an autonomous mode.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
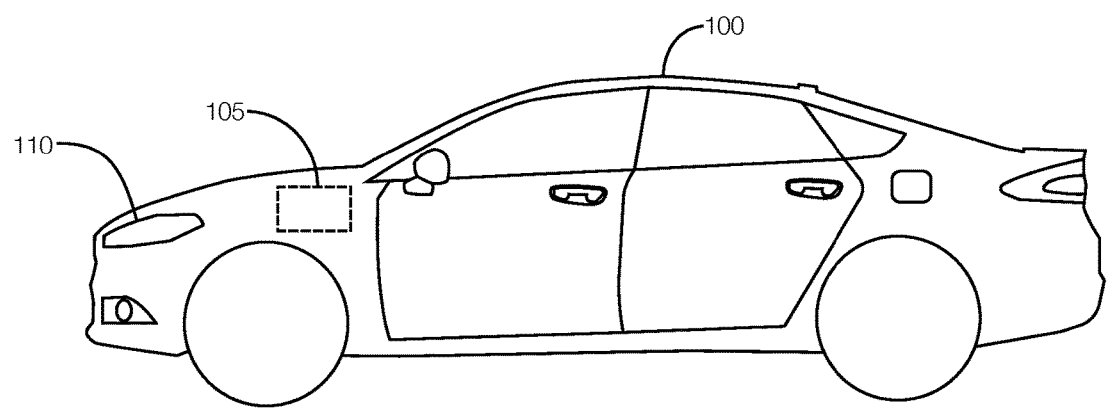
FIG. 1 illustrates an example vehicle with a headlight control system for turning off the vehicle headlights when the vehicle is operating in an autonomous mode.

As illustrated in FIG. 1, a host vehicle 100 includes a headlight control system 105 that controls certain operations of the headlights 110 to, e.g., conserve energy consumption while the host vehicle 100 is operating in an autonomous mode. The headlight control system 105 may operate in accordance with on-board vehicle sensors (see FIG. 2) that identify an object near the host vehicle 100. Examples of "objects" may include other vehicles, cyclists, pedestrians, animals, etc. The headlight control system 105 may keep the headlights 110 deactivated when no objects are detected and activate the headlights 110 in response to detecting an object. Instead of keeping the headlights 110 deactivated, the headlight control system 105 may dim the headlights 110, which would also conserve some energy. Alternatively or in addition, the headlight control system 105 may detect objects via vehicle-to-vehicle or vehicle-to-infrastructure communication. For instance, the headlight control system 105 may activate the headlights 110 in response to a signal from a nearby vehicle announcing its presence via, e.g., the Dedicated Short-Range Communication (DSRC) protocol.

The headlights 110 include a light source that projects light ahead of the host vehicle 100. The headlights 110 may be implemented via light bulbs, light emitting diodes (LEDs), etc. The headlights 110 may become activated (e.g., the headlights 110 turn on or brighten) in response to receiving a headlight activation signal output by the headlight control system 105. The headlights 110 may turn off in response to receiving a headlight deactivation signal. In some possible implementations, the headlight deactivation signal may be the absence of the headlight activation signal. The headlights 110 may dim in response to a headlight dimming signal. The headlights 110 may be electrically connected to a power source, and the headlight activation signal, the headlight deactivation signal, and the headlight dimming signal may control the amount of electrical power provided to the headlights 110. For instance, the headlight activation signal, the headlight deactivation signal, and the headlight dimming signal may control one or more switches that electrically connect the headlights 110 to the power source.

Although illustrated as a sedan, the host vehicle 100 may include any passenger or commercial automobile such as a car, a truck, a sport utility vehicle, a crossover vehicle, a van, a minivan, a taxi, a bus, etc. Further, the host vehicle 100 is an autonomous vehicle that can operate in an autonomous (e.g., driverless) mode, a partially autonomous mode, and/or a non-autonomous mode.

Figure 2:
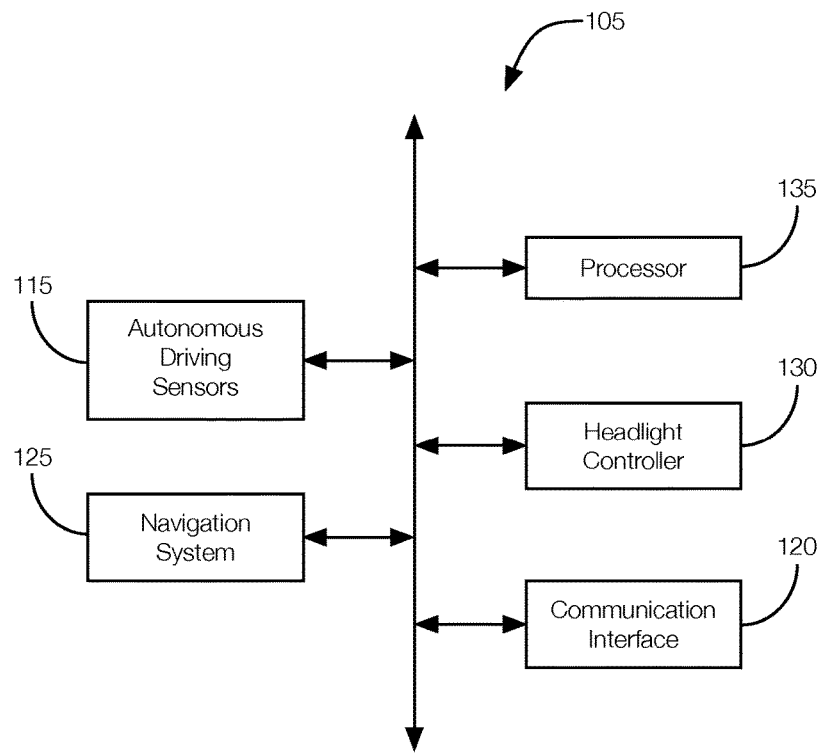
FIG. 2 is a block diagram illustrating example components of the headlight control system.

Referring now to FIG. 2, the headlight control system 105 includes or works in concert with autonomous driving sensors 115, a communication interface 120, a navigation system 125, a headlight controller 130, and a processor 135.

The autonomous driving sensors 115 monitor an area around the host vehicle 100 and output signals that can be used to control the host vehicle 100 in an autonomous or partially autonomous mode. Examples of autonomous driving sensors 115 include LIDAR sensors, RADAR sensors, ultrasound sensors, vision sensors (e.g., cameras), or the like. The autonomous driving sensors 115 may sense the area around the host vehicle 100 and identify potential objects. For instance, the autonomous driving sensors 115 may be programmed to detect the roadway, lane markers, traffic control devices, traffic signs, etc. Further, as discussed above, the autonomous driving sensors 115 may be programmed to identify objects of interest such as other vehicles, cyclists, pedestrians, or the like. The autonomous driving sensor may output an object detection signal in response to detecting an object of interest near the host vehicle 100. The autonomous driving sensor may output the object detection signal to, e.g., the processor 135, the headlight controller 130, or both.

The communication interface 120 is implemented via circuits, chips, or other electronic components that can facilitate wireless communication with other vehicles or infrastructure devices via, e.g., the Dedicated Short-Range Communication (DSRC) protocol. The communication interface 120 may be programmed to wirelessly transmit messages to, and receive messages from, other vehicles and infrastructure devices. The received messages may be transmitted to other components of the host vehicle 100, such as the processor 135. For example, the communication interface 120 may generate and output a vehicle detection signal in accordance with a DSRC message received. The vehicle detection signal may indicate the presence of a nearby vehicle.

The navigation system 125 is implemented via circuits, chips, or other electronic components that can determine the present location of the host vehicle 100, a destination of the host vehicle 100, a route from the present location to the destination, etc. The navigation system 125 may rely on communication with various satellites to triangulate the location of the host vehicle 100. For instance, the navigation system 125 may determine the location of the host vehicle 100 in accordance with the Global Positioning System (GPS) protocol. Further, the navigation system 125 may have access to a database that provides additional information about the location. For instance, the information stored in the database may include, e.g., whether the location is an urban or rural area, the size of the road, whether the road is a one-way street, etc. The navigation system 125 may output the location of the host vehicle 100 and other information to, e.g., the processor 135.

The headlight controller 130 is implemented via circuits, chips, or other electronic components that can control operation of the headlights 110. The headlight controller 130 may be programmed to receive the headlight activation signal, headlight deactivation signal, and headlight dimming signal and control the operation of the headlight accordingly. For instance, the headlight controller 130 may activate the headlights 110 in response to receiving the headlight activation signal, may turn off the headlights 110 in response to receiving the headlight deactivation signal, and may dim the headlights 110 in response to receiving the headlight dimming signal. The headlight controller 130 may control the headlights 110 by controlling the flow of electrical energy from a power supply to the headlights 110. For example, the headlight controller 130 may control various switches, relays, actuators, etc. that electrically connect or disconnect the power supply and the headlights 110. Further, the headlight controller 130 may adjust the amount of electrical energy provided to the headlights 110, which may be useful when dimming the headlights 110.

The processor 135 is implemented via circuits, chips, or other electronic components that can control operations of the headlights 110 according to whether the host vehicle 100 is operating in an autonomous mode and whether an object of interest has been detected. Specifically, the processor 135 may be programmed to activate the vehicle headlights 110 when the object detection signal indicates that an object of interest is nearby and when the host vehicle 100 is operating in the autonomous mode. In some possible approaches, the processor 135 may be incorporated into other vehicle systems such as the headlight controller 130 or an autonomous mode controller.

The processor 135 may be programmed to receive the object detection signal output by the autonomous driving sensors 115. As discussed above, the object detection signal may represent an object of interest near the host vehicle 100. In some instances, the processor 135 may be programmed to further process the object detection signal to determine if, e.g., the object identifies a nearby vehicle, a pedestrian, a cyclist, or anything else that may benefit from having the headlights 110 of the host vehicle 100 turned on. Thus, the processor 135 may avoid turning on the headlights 110 when a less relevant object (e.g., a traffic control device or road sign) is detected.

The processor 135 may be programmed to control the headlights 110 by outputting various signals to, e.g., the headlight controller 130. For instance, the processor 135 may output, to the headlight controller 130, a headlight activation signal to activate the headlights 110, a headlight deactivation signal to deactivate the headlights 110, and a headlight dimming signal to dim the headlights 110. The processor 135 may be programmed to generate and output the headlight activation signal when the host vehicle 100 is operating in the autonomous mode and an object of interest is detected nearby. The processor 135 may be programmed to generate and output the headlight deactivation signal when the host vehicle 100 is operating in the autonomous mode and no objects of interest are detected nearby. Alternatively, the processor 135 may be programmed to generate and output the headlight dimming signal when the host vehicle 100 is operating in the autonomous mode and no objects of interest are detected nearby.

In some instances, the processor 135 may be programmed to generate and output the headlight deactivation signal or the headlight dimming signal in accordance with the location of the host vehicle 100. The processor 135, for instance, may be programmed to receive the location of the host vehicle 100 as determined by the navigation system 125. Moreover, the processor 135 may consider other information, such as information stored in a database, associated with the data. The processor 135 may be programmed to generate and output the headlight deactivation signal if the present location of the host vehicle 100 indicates that it is a low-traffic area. An example of a low traffic area may include a rural area, a one-way road, etc.

The processor 135 may be programmed to detect a nearby vehicle based on communications received via the communication interface 120. For instance, the processor 135 may receive, from the communication interface 120, the vehicle identification signal indicating that another vehicle is nearby. As discussed above, the vehicle identification signal may be generated by the communication interface 120 after the communication interface 120 receives a vehicle-to-vehicle or vehicle-to-infrastructure communication indicating the presence of a nearby vehicle. Further, the vehicle identification signal may include various information about the nearby vehicle such as the location of the vehicle, the vehicle heading, the vehicle speed, etc. The processor 135 may determine that another vehicle is nearby, as well as the proximity of the nearby vehicle relative to the host vehicle 100, based on the vehicle detection signal and the information included in the message received via the communication interface 120. The processor 135 may be programmed to activate the headlights 110, e.g., by generating and outputting the headlight activation signal, in response to receiving the vehicle detection signal.

FIGS. 3A-3D illustrate different scenarios 300A-300D where the headlight control system 105 may activate or deactivate the headlights 110. Assume for each scenario 300A-300D that the headlights 110 would be turned on if the host vehicle 100 were being operated manually (e.g., in a non-autonomous or partially autonomous mode). For example, scenarios 300A-300D may represent low-light conditions.

Figures 3A, 3B:
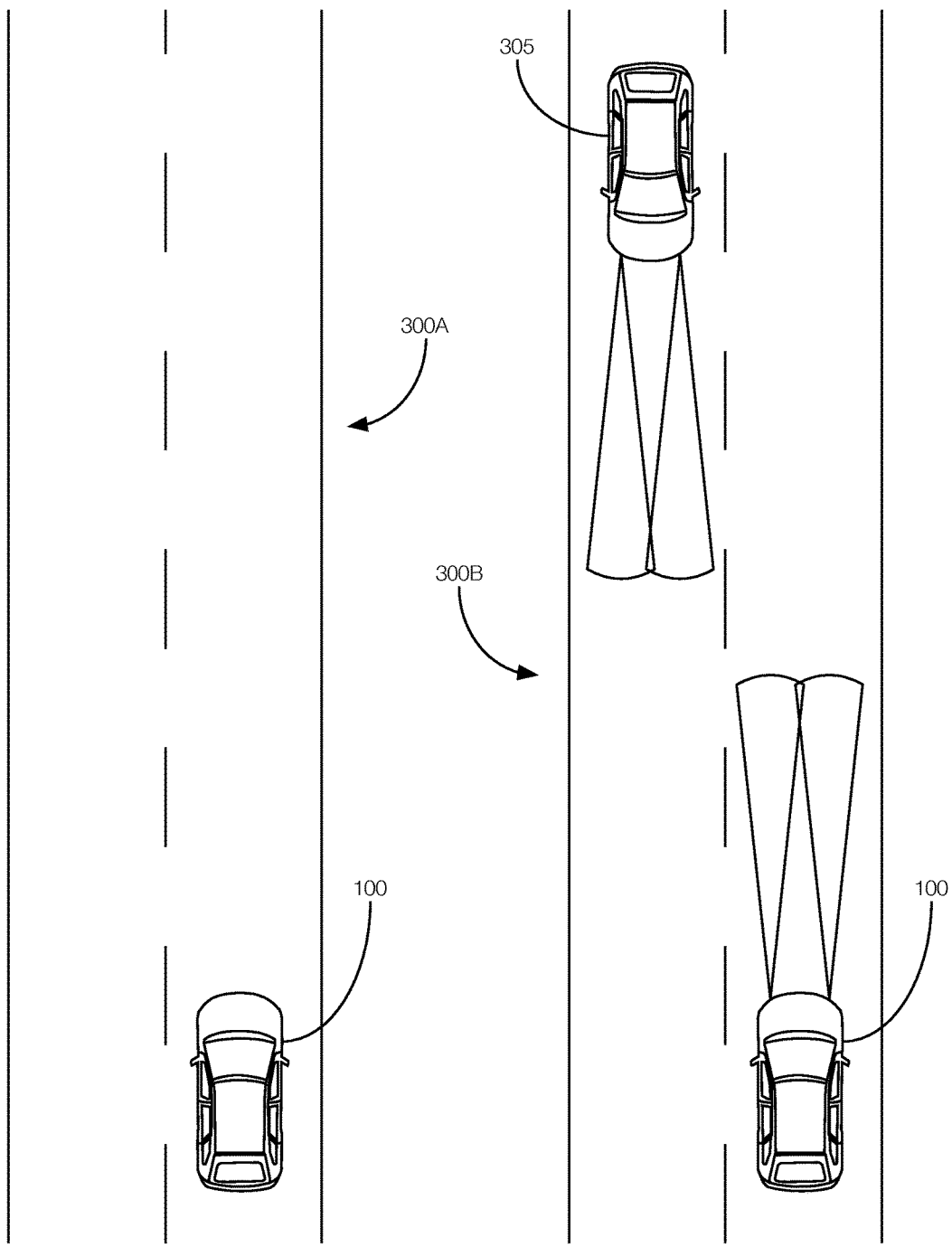
FIG. 3A illustrates an example scenario where the vehicle operates without its headlights activated since no other vehicles are detected.
FIG. 3B illustrates an example scenario where the vehicle headlights are activated when an oncoming vehicle is detected.

FIG. 3A illustrates a scenario 300A where the host vehicle 100 is operating in an autonomous mode and there are no nearby objects of interest. As such, the headlights 110 are off even though the host vehicle 100 is moving. The host vehicle 100 conserves energy by turning off the headlights 110.

FIG. 3B illustrates a scenario 300B where the host vehicle 100 comes upon another vehicle 305 (i.e., an object of interest) traveling in the opposite direction as the host vehicle 100. In this scenario 300A, the headlight control system 105 activates the headlights 110 of the host vehicle 100. For instance, the processor 135 of the headlight control system 105 may output the headlight activation signal to the headlight controller 130. When the other vehicle 305 passes the host vehicle 100, the processor 135 may output the headlight deactivation signal to the headlight controller 130 to turn off the headlights 110. Alternatively, the processor 135 may output the headlight dimming signal to the headlight controller 130 to dim the headlights 110. The processor 135 may detect the vehicle 305 via the autonomous driving sensors 115 or wireless communications, such as DSRC signals, transmitted from the other vehicle 305. The processor 135 may output the headlight activation signal in response to detecting the other vehicle 305.

Figure 3C:
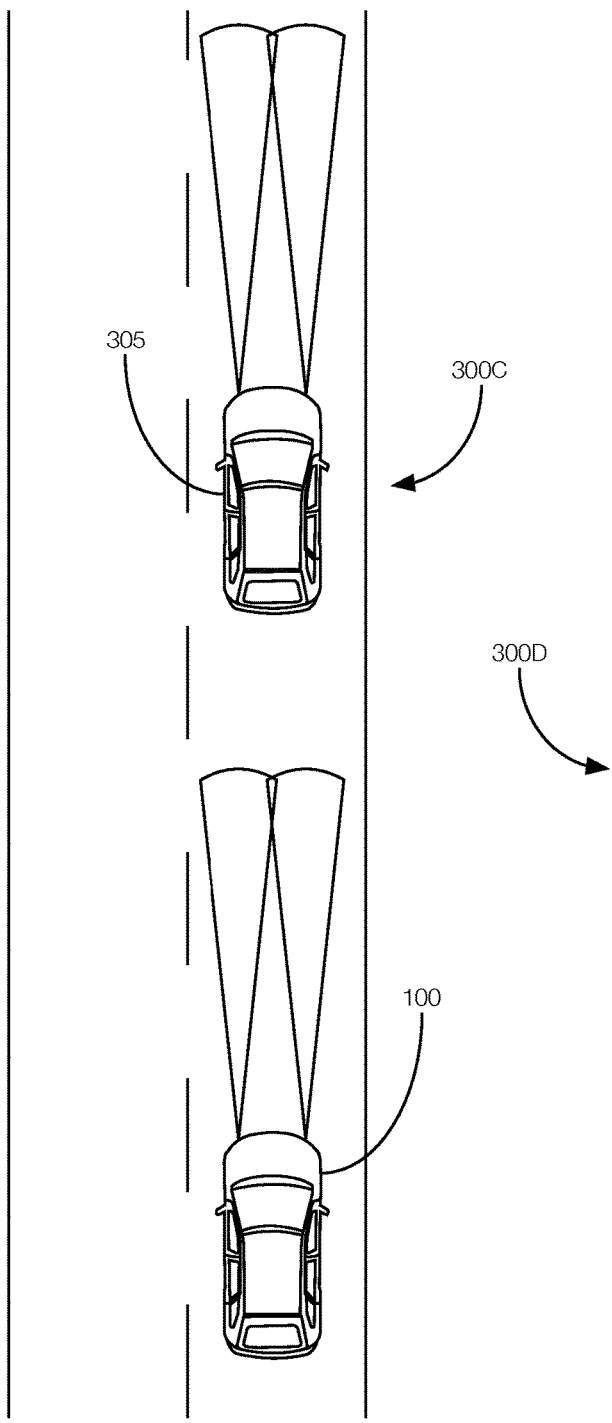
FIG. 3C illustrates an example scenario where the vehicle headlights are activated when the vehicle approaches another vehicle in the same lane.

FIG. 3C illustrates a scenario 300C where the host vehicle 100 comes upon another vehicle 305 traveling in the same direction as the host vehicle 100. As with the previous scenario 300B, the headlight control system 105 activates the headlights 110 of the host vehicle 100 when the host vehicle 100 detects the presence of the other vehicle 305. For instance, the processor 135 of the headlight control system 105 may output the headlight activation signal to the headlight controller 130. When the other vehicle 305 turns off the road, the host vehicle 100 passes the other vehicle 305, or the other vehicle 305 is otherwise no longer near the host vehicle 100, the processor 135 may output the headlight deactivation signal to the headlight controller 130 to turn off the headlights 110. Alternatively, the processor 135 may output the headlight dimming signal to the headlight controller 130 to dim the headlights 110. The processor 135 may detect the vehicle 305 via the autonomous driving sensors 115 or wireless communications, such as DSRC signals, transmitted from the other vehicle 305. The processor 135 may output the headlight activation signal in response to detecting the other vehicle 305.

Figure 3D:
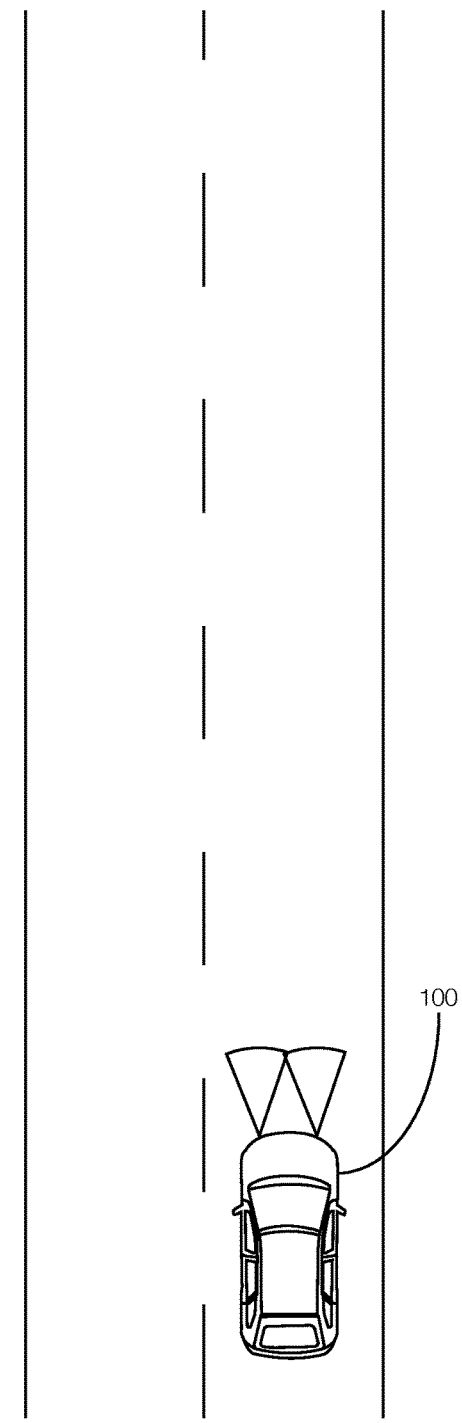
FIG. 3D illustrates an example scenario where the headlights are dimmed when no nearby vehicles are detected.

FIG. 3D illustrates a scenario 300D where the host vehicle 100 is operating in an autonomous mode and there are no nearby objects of interest, similar to the scenario 300A. In the scenario 300D, however, the headlights 110 are dimmed as opposed to turned off. Even still, the host vehicle 100 conserves some energy by dimming the headlights 110.

Figure 4:
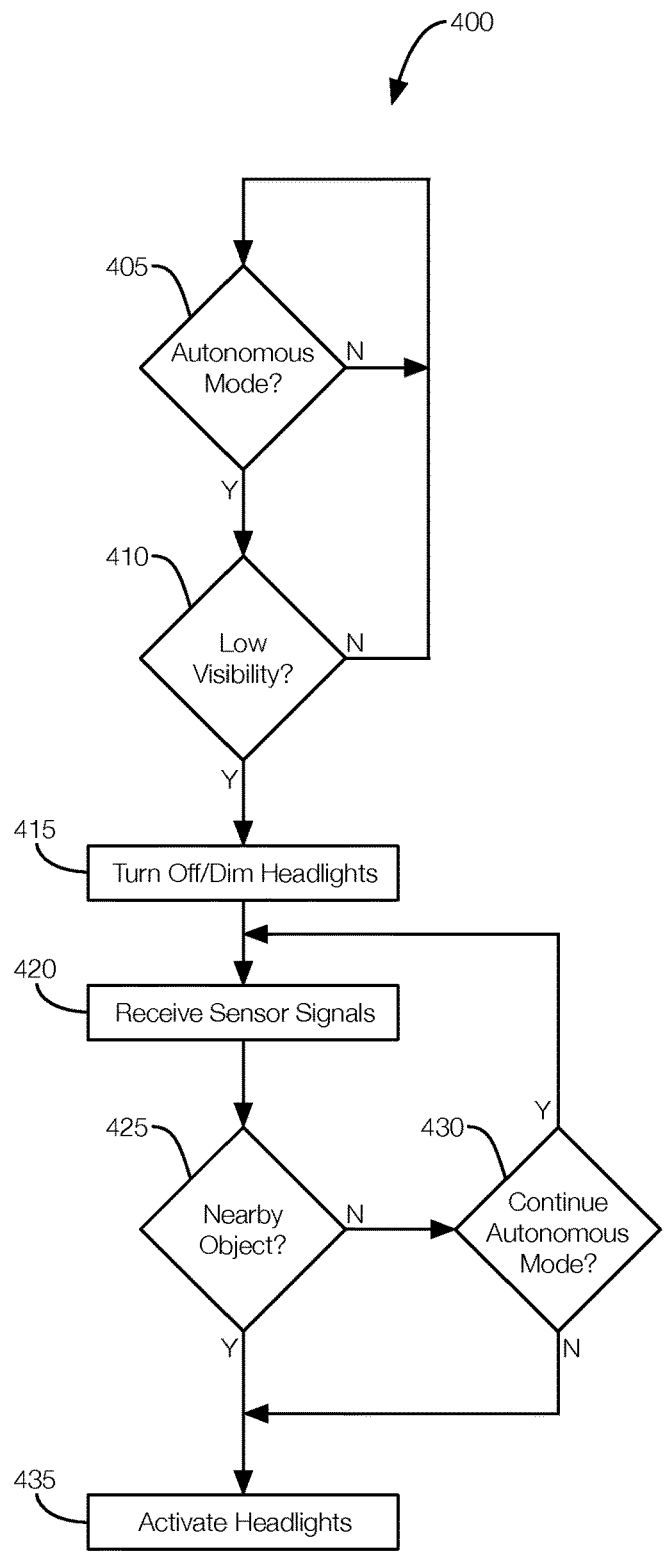
FIG. 4 is a flowchart of an example process that may be executed by the headlight control system.

FIG. 4 is a flowchart of an example process 400 that may be executed by the headlight control system 105. The process 400 may begin any time the host vehicle 100 is running and may continue to execute until the host vehicle 100 is turned off or until the headlight control system 105 is otherwise disabled (e.g., by a user input).

At decision block 405, the headlight control system 105 determines whether the host vehicle 100 is operating in the autonomous mode. The processor 135 may determine that the host vehicle 100 is operating in the autonomous mode based on signals received from, e.g., an autonomous mode controller or a user input, provided to a user interface, commanding the vehicle to operate in the autonomous mode. If the processor 135 determines that the host vehicle 100 is operating in the autonomous mode, the process 400 may proceed to block 410. Otherwise, the process 400 may continue to execute block 405 until the processor 135 determines that the host vehicle 100 is operating in the autonomous mode.

At decision block 410, the headlight control system 105 determines whether visibility is low. Visibility may be low while driving at night, driving in the early morning or late evening, during storms or other weather events that reduce visibility (e.g., fog, clouds, etc.), or the like. For instance, the processor 135 may detect the low light condition from signals output by other vehicle components such as ambient light sensors. If visibility is low, the process 400 may proceed to block 415. Otherwise, the process 400 may return to block 405 to determine whether the host vehicle 100 is still operating in the autonomous mode. In addition to visibility, the processor 135 may further consider the location of the host vehicle 100 at block 410. For instance, if the host vehicle 100 is in an urban environment or other high traffic or heavy populated area, the process 400 may proceed to block 405 (e.g., following the path of a negative result at block 410).

At block 415, the headlight control system 105 turns off or dims the headlights 110. For instance, the processor 135 may output the headlight deactivation signal to the headlight controller 130 to turn off the headlights 110. Alternatively, the processor 135 may output the headlight dimming signal to the headlight controller 130 to dim the headlights 110. Thus, the headlights 110 will remain off or dimmed so long as the host vehicle 100 is operating in the autonomous mode and no nearby objects of interest are detected. Further, the turning off or dimming of the headlights 110 may be in accordance with the location of the host vehicle 100 if, e.g., location is considered at decision block 410.

At block 420, the headlight control system 105 receives sensor signals. The sensor signals may include an object detection signal representing the presence of nearby objects of interest such as other vehicles, pedestrians, cyclists, etc. The processor 135 may receive and process the sensor signals output by the autonomous driving sensors 115.

At decision block 425, the headlight control system 105 determines whether the sensor signals represent a nearby object of interest (e.g., whether the sensor signals are object detection signals). For instance, the processor 135 may determine whether the sensor signals indicate another vehicle, a pedestrian, or a cyclist near the host vehicle 100. If the sensor signal represents the presence of nearby objects of interest, the process 400 may proceed to block 430. If the sensor signal does not indicate the presence of nearby objects of interest, the process 400 may proceed to block 435.

At decision block 430, the headlight control system 105 determines whether the host vehicle 100 will continue operating in the autonomous mode. For instance, the processor 135 may determine whether the host vehicle 100 will continue to operate in the autonomous mode in accordance with signals received from an autonomous mode controller or a user input provided to, e.g., a user interface. If the host vehicle 100 will not continue operating in the autonomous mode, the process 400 may proceed to block 435. If the host vehicle 100 will continue operating in the autonomous mode, the process 400 may return to block 420.

At block 435, the headlight control system 105 activates the headlights 110. For instance, the processor 135 may output the headlight activation signal to the headlight controller 130. The headlight controller 130 may turn on the headlights 110 in response to receiving the headlight activation signal. Therefore, the headlights 110 may be activated while the host vehicle 100 is operating in a non-autonomous or partially autonomous mode (from block 430) or in response to detecting an object of interest while operating in the autonomous mode (from block 425). The process 400 may return to block 405 or 410 after block 435 so that the state of the headlights 110 may be repeatedly evaluated and controlled while the host vehicle 100 is in operation.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
an autonomous driving sensor programmed to output an object detection signal representing an object near a host vehicle; and
a processor programmed to output a headlight activation signal to activate vehicle headlights in response to receiving the object detection signal and while the host vehicle is operating in an autonomous mode.

2. The vehicle system of claim 1, wherein the processor is programmed to output a headlight deactivation signal to deactivate the vehicle headlights.

3. The vehicle system of claim 2, wherein the processor is programmed to output the headlight deactivation signal when the host vehicle is operating in the autonomous mode and when no objects are detected near the host vehicle.

4. The vehicle system of claim 2, wherein the processor is programmed to output the headlight deactivation signal based at least in part on a location of the host vehicle.

5. The vehicle system of claim 1, further comprising a communication interface programmed to output a vehicle detection signal representing a presence of at least one nearby vehicle.

6. The vehicle system of claim 5, wherein the processor is programmed to output the headlight activation signal in to activate the vehicle headlights in response to receiving the vehicle detection signal.

7. The vehicle system of claim 1, wherein the processor is programmed to output a headlight dimming signal to dim the vehicle headlights.

8. The vehicle system of claim 7, wherein the processor is programmed to output the headlight dimming signal when the host vehicle is operating in the autonomous mode and when no objects are detected near the host vehicle.

9. A vehicle system comprising:
headlights;
an autonomous driving sensor programmed to output an object detection signal representing an object near a host vehicle; and
a processor programmed to output a headlight activation signal to activate the headlights in response to receiving the object detection signal and while the host vehicle is operating in an autonomous mode and output a headlight deactivation signal to deactivate the headlights when the host vehicle is operating in the autonomous mode and when no objects are detected near the host vehicle.

10. The vehicle system of claim 9, wherein the processor is programmed to output the headlight deactivation signal based at least in part on a location of the host vehicle.

11. The vehicle system of claim 9, further comprising a communication interface programmed to output a vehicle detection signal representing a presence of at least one nearby vehicle, wherein the processor is programmed to output the headlight activation signal in to activate the headlights in response to receiving the vehicle detection signal.

12. The vehicle system of claim 9, wherein the processor is programmed to output a headlight dimming signal to dim the headlights.

13. The vehicle system of claim 12, wherein the processor is programmed to output the headlight dimming signal when the host vehicle is operating in the autonomous mode and when no objects are detected near the host vehicle.

14. A method comprising:
determining that a host vehicle is operating in an autonomous mode;
detecting an object near the host vehicle; and
activating vehicle headlights in response to detecting the object near the host vehicle.

15. The method of claim 14, wherein detecting the object near the host vehicle includes receiving an object detection signal representing the object detected near the host vehicle.

16. The method of claim 14, further comprising outputting a headlight deactivation signal to deactivate the vehicle headlights when the host vehicle is operating in the autonomous mode and when no objects are detected near the host vehicle.

17. The method of claim 16, wherein the headlight deactivation signal is output based at least in part on a location of the host vehicle.

18. The method of claim 14, further comprising detecting a presence of at least one nearby vehicle via a wireless communication interface, wherein the vehicle headlights are activated in response to detecting the presence of the at least one nearby vehicle.

19. The method of claim 14, further comprising outputting a headlight dimming signal to dim the vehicle headlights.

20. The method of claim 19, wherein the headlight dimming signal is output when the host vehicle is operating in the autonomous mode and when no objects are detected near the host vehicle.

* * * * *

UNITED STATES PATENT AND TRADEMARK OFFICE
CERTIFICATE OF CORRECTION

PATENT NO. : 10,071,675 B2
APPLICATION NO. : 15/227144
DATED : September 11, 2018
INVENTOR(S) : Aed M. Dudar Page 1 of 1

It is certified that error appears in the above-identified patent and that said Letters Patent is hereby corrected as shown below:

In the Claims

Column 9, Line 41 – Replace "signal in to" with --signal to--; and

Column 10, Line 16 – Replace "signal in to" with --signal to--.

Signed and Sealed this
Third Day of November, 2020

Andrei Iancu
*Director of the United States Patent and Trademark Office*